US008175044B2

(12) United States Patent
Seki et al.

(10) Patent No.: US 8,175,044 B2
(45) Date of Patent: May 8, 2012

(54) WIRELESS COMMUNICATION SYSTEM AND WIRELESS COMMUNICATION METHOD

(75) Inventors: Hiroyuki Seki, Kawasaki (JP); Dai Kimura, Kawasaki (JP); Tsuyoshi Shimomura, Kawasaki (JP); Hiroyuki Ishii, Yokosuka (JP); Yoshihisa Kishiyama, Yokosuka (JP); Kenichi Higuchi, Yokohama (JP); Sadayuki Abeta, Yokohama (JP)

(73) Assignees: Fujitsu Limited, Kawasaki (JP); NTT DoCoMo, Tokyo (JP)

( * ) Notice: Subject to any disclaimer, the term of this patent is extended or adjusted under 35 U.S.C. 154(b) by 495 days.

(21) Appl. No.: 12/010,848

(22) Filed: Jan. 30, 2008

(65) Prior Publication Data

US 2008/0186880 A1 Aug. 7, 2008

(30) Foreign Application Priority Data

Feb. 6, 2007 (JP) ................................. 2007-027172

(51) Int. Cl.
*H04L 12/28* (2006.01)
*H04B 15/00* (2006.01)
(52) U.S. Cl. ..................... 370/329; 370/395.4; 455/63.1
(58) Field of Classification Search .................. 370/203, 370/206, 208, 310, 329, 330, 480–482, 395.4, 370/395.41, 395.43, 412, 230.1; 455/63.1, 455/73, 410, 434, 438, 450, 452.2, 500, 501, 455/509, 522, 525, 561

See application file for complete search history.

(56) References Cited

U.S. PATENT DOCUMENTS

| 7,236,792 | B2 * | 6/2007 | Uchida et al. | ............. | 455/452.1 |
|---|---|---|---|---|---|
| 2005/0030887 | A1 * | 2/2005 | Jacobsen et al. | ............. | 370/208 |
| 2005/0111406 | A1 * | 5/2005 | Pasanen et al. | ............... | 370/329 |
| 2006/0187872 | A1 * | 8/2006 | Rich | .............................. | 370/328 |
| 2007/0064665 | A1 * | 3/2007 | Zhang et al. | ................... | 370/343 |
| 2007/0189205 | A1 * | 8/2007 | Terry et al. | ..................... | 370/328 |
| 2007/0201503 | A1 * | 8/2007 | Nishio | .......................... | 370/437 |
| 2007/0297323 | A1 | 12/2007 | Seki | | |

(Continued)

FOREIGN PATENT DOCUMENTS

WO    WO 2006-092852    9/2006

OTHER PUBLICATIONS

3GPP TSG RAN WG1 347bis R1-070266; Summary of Reflector Discussions on EUTRA UL DM RS; Jan. 19, 2007.

(Continued)

*Primary Examiner* — Chi Pham
*Assistant Examiner* — Prince Mensah
(74) *Attorney, Agent, or Firm* — Murphy & King, P.C.

(57) ABSTRACT

The present invention is a wireless communication system having a mobile station and a wireless base station, wherein the wireless base station further having a scheduling processing unit which divides system bandwidth into a plurality of wireless resource blocks in a frequency domain, performs scheduling so that other channels are not assigned to the wireless resource blocks which are adjacent to a first channel when the first channel whose frequency characteristic is not orthogonal to the other channels is assigned to a certain wireless resource block resulting from the division, and creates scheduling information on the scheduling that is performed; and a transmission unit which transmits the scheduling information created by the scheduling processing unit to the mobile station, and the mobile station transmits a channel signal to the wireless base station on the basis of the scheduling information and the wireless base station receives the channel signal transmitted from the mobile station.

9 Claims, 12 Drawing Sheets

U.S. PATENT DOCUMENTS

2008/0049708 A1* 2/2008 Khan et al. .................. 370/343
2008/0095254 A1* 4/2008 Muharemovic et al. ...... 375/260
2008/0101306 A1* 5/2008 Bertrand et al. ............. 370/336
2008/0310537 A1* 12/2008 Mukai ......................... 375/260
2008/0316961 A1* 12/2008 Bertrand et al. ............. 370/329

OTHER PUBLICATIONS

3GPP TR 25.814 V7.1.0; 3rd Generation Partnership Project; Technical Specification Group Radio Access Network; Physical layer aspects for evolved Universal Terrestrial Radio Access (UTRA) (Release 7); (Sep. 2006).

* cited by examiner

FIG. 3   Scheduling procedure

FIG. 4
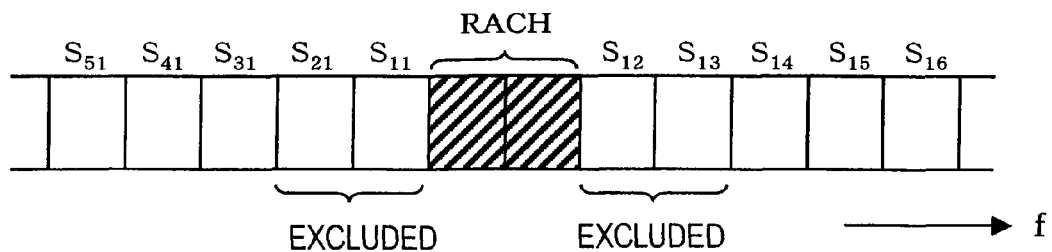
FIG. 5A
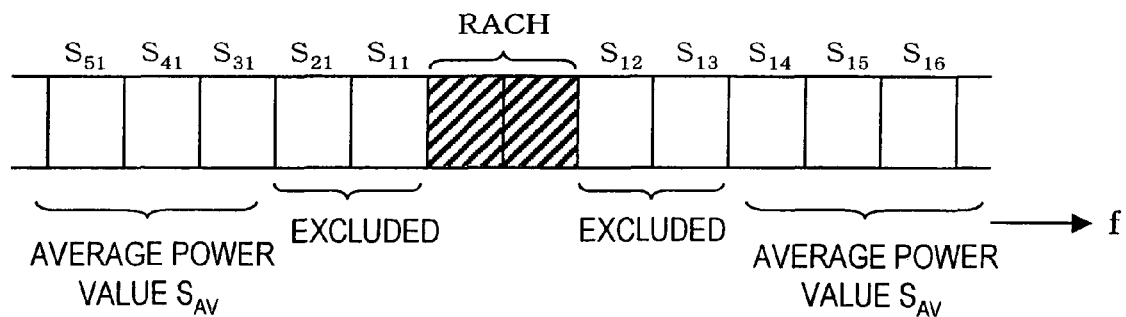
FIG. 5B
| $S_{AV}$ | TRANSMISSION RATE | MODULATION ORDER | CODING RATE | |
|---|---|---|---|---|
| 5 (dB) | 1 | 2 (QPSK) | 0.5 | 671 |
| 10 (dB) | 3 | 6 (64QAM) | 0.5 | |
| ⋮ | ⋮ | ⋮ | ⋮ | |

PROPORTION 2/6 OF WIRELESS RESOURCE BLOCKS
ADJACENT TO RACH ≥ THRESHOLD VALUE?

WIRELESS COMMUNICATION SYSTEM AND WIRELESS COMMUNICATION METHOD

CROSS-REFERENCE TO RELATED APPLICATIONS

This application is based upon and claims the benefit of priority from the prior Japanese Patent Application No. 2007-27172, filed on Feb. 6, 2007, the entire contents of which are incorporated herein by reference.

BACKGROUND OF THE INVENTION

1. Field of the Invention

The present invention relates to a wireless communication system for communication between a wireless base station and a mobile station and to a wireless communication method.

2. Description of the Related Art

An LTE (Long Term Evolution)-based wireless communication system between a wireless base station and a mobile station has been proposed (3GPP TR 25.814 V7.1.0 (2006-09)).

With LTE, a packet switching-type access system is adopted, with wireless resources being assigned using frequency domain scheduling to the uplink (from the mobile station to the wireless base station) and the downlink (from the wireless base station to the mobile station). An LTE system will be described by taking the LTE uplink that appears in 3GPP TR 25.814 V7.1.0 (2006-09) as an example.

FIG. 8 is a conceptual view of the wireless communication system. The wireless communication system has a wireless base station ('base station' hereinbelow) 100 and a mobile station 200.

A random access channel, an uplink reference channel, an uplink shared data channel, and an uplink control channel is transmitted from the mobile station 200 to the base station 100 in the uplink.

The random access channel is used at the time of initial access when communication is started or during handover and is utilized in order to establish synchronization between the uplink mobile station 200 and base station 100.

The uplink reference channel is a channel that is used in demodulation processing of shared data channel and control channel, in the measurement of communication quality (channel state such as, for example, the ratio between the desired signal power and undesired signal power (SIR, SNR or the like)) for the purpose of scheduling, and in delay profile measurement for transmission timing control.

The uplink shared data channel is a channel that is used in the transmission of traffic data (information bits) and is transmitted by using wireless resources which is assigned by the scheduling of the base station 100.

The uplink control channel is a channel that is used in order to transmit information that is required for processing to receive the shared data channel (data size and retransmission control information) and to transmit scheduling requests (traffic amount and information type or the like).

However, a downlink control channel is transmitted from the base station 100 to the mobile station 200 in the downlink. The downlink control channel is a channel that is used in order to transmit assigning information of the uplink shared data channel that is assigned by the scheduling in the base station 100 (scheduling information) and to transmit an ACK/NACK result for the uplink shared data channel, or the like.

FIG. 9 shows an example of the uplink frame format (3GPP R1-070266, Texas Instruments, "Summary of Reflector Discussions on EUTRA DM RS", January 2007). A CP (Cyclic Prefix) to which a rear portion of the symbol data is copied is inserted in a front portion of each symbol. The reference channel or the shared data channel or the like is inserted in the symbol of a predetermined region and transmitted from the mobile station 200 to the base station 100. Further, as shown in FIG. 9, a reference channel for demodulating the shared data channel is inserted in symbols '#4' and '#11', and a frame with a '1 ms' transmission interval is constituted by fourteen symbols.

FIG. 10 represents the uplink frame format in two dimensions which are the time axis (horizontal axis) and frequency axis (vertical axis). The system bandwidth is divided into a plurality of bands, and wireless resource blocks are defined by the divided bandwidth and single block that is delimited by the transmission interval. The uplink scheduling is performed by assigning users to the respective wireless resource blocks. In the example shown in FIG. 10, a control channel is assigned to the wireless resource block at both ends of the system bandwidth and a control data channel is transmitted without being attached to the shared data channel.

FIG. 11 shows a timing example in a case where the signals from the respective users are received in sync by the base station 100. Generally, in the case of the uplink, the wireless resource blocks are transmitted with different timing and, therefore, the timing with which the base station 100 receives the blocks varies. However, the cutting range in cases where the base station 100 subjects the respective symbols to an FFT is fixed. Therefore, the base station 100 uses transmission timing control to control the transmission timing for each user (mobile station 200) so that the fixed FFT cutoff range of the base station 100 lies within the symbol range of each user. The transmission timing control is executed as a result of the transmission timing control information generated on the basis of the delay time that is obtained from the delay profile being transmitted from the base station 100 to the mobile station 200 and as a result of the mobile station 200 adjusting the transmission timing on the basis of this information.

As shown in FIG. 11, reception signals which are in a synchronized state are subjected to FFT which is performed collectively with fixed timing by the base station 100 and are divided into respective wireless resource blocks. However, in cases where a reception signal that is not in a synchronized state exists, the reception signal no longer possesses an orthogonal frequency characteristic after the FFT processing and interferes with the reception signals of other users.

In the case of OFDM, when a reception signal undergoes FFT processing and the spectrum is illustrated, the subcarrier which is adjacent to the NULL point of a certain subcarrier (the point at which the signal power is lowest) is the peak. In this case, the frequency characteristic of the reception signal has an orthogonal relationship and no interference between the respective subcarriers is produced.

However, when the reception signal of a certain user is not contained in the FFT cutoff range, the adjacent subcarrier is not the peak at the NULL point of a certain subcarrier. In this case, interference is produced because the frequency characteristic is not orthogonal.

However, in an LTE uplink, the random access channel ('RACH' hereinbelow) is also multiplexed in wireless resource blocks. FIG. 12 shows an example of a RACH multiplexing method. As shown in FIG. 12, the RACH uses six wireless resource blocks and the transmission of the RACH with a '10 ms' transmission interval is determined by 3GPP TR 25.814 V7.1.0 (2006-09) below.

FIG. 13 shows an example of the RACH frame format (3GPP TR 25.814 V7.1.0 (2006-09) hereinbelow). In RACH transmission, a frame is constituted by a CP having a 0.1 ms interval and a RACH having a 0.8 ms interval, and a guard time having a 0.1 ms interval is provided.

A RACH is channel data that are initially transmitted from the mobile station 200 to the base station 100 and is transmitted in a non-synchronization state such as during initial access as mentioned earlier. As a result of the RACH being transmitted in a non-synchronization state, it is difficult to make the channel signals of the other wireless resource blocks and the frequency characteristic orthogonal. However, by providing the RACH with a guard time as shown in FIG. 13, it is possible to prevent the generation of interference with the next transmission interval.

However, even when a guard time is provided, as shown in FIG. 13, when a signal is transmitted with the same transmission timing as the RACH, there is mutual interference between the signal and the RACH.

FIG. 14 schematically represents the interference of the RACH signal with adjacent wireless resource blocks. Normally, the spectrum of the transmission signal is not rectangular and has a shape with a fixed spread. Although the signals of the adjacent resource blocks likewise also has a spread shape, in cases where there is mutual synchronization, the spread components of the spectrum are also orthogonal on the frequency axis and do not interfere with one another. However, the frequency characteristics of signals which are transmitted asynchronously such as RACH signals are not orthogonal and, in cases where a signal has been assigned to the wireless resource blocks which are located right next to the RACH (#m+2, #m+9) in particular, there is the problem that the interference of the RACH is very large and the transmission characteristic of the signal deteriorates over a wide interval.

SUMMARY OF THE INVENTION

Therefore, the present invention was conceived in view of the above problem and an object thereof is to provide a wireless communication system and wireless communication method causing to improve the transmission efficiency even in cases where asynchronous channels are transmitted.

In order to achieve the above object, one aspect of the present invention is a wireless communication system having a mobile station and a wireless base station, wherein the wireless base station further having a scheduling processing unit which divides system bandwidth into a plurality of wireless resource blocks in a frequency domain, performs scheduling so that other channels are not assigned to the wireless resource blocks which are adjacent to a first channel when the first channel whose frequency characteristic is not orthogonal to the other channels is assigned to a certain wireless resource block resulting from the division, and creates scheduling information on the scheduling that is performed; and a transmission unit which transmits the scheduling information created by the scheduling processing unit to the mobile station, and the mobile station transmits a channel signal to the wireless base station on the basis of the scheduling information and the wireless base station receives the channel signal transmitted from the mobile station.

In order to achieve the above object, the other aspect of the present invention is a wireless communication method in a wireless communication system having a mobile station and a wireless base station, comprising the steps of dividing system bandwidth into a plurality of resource blocks in a frequency domain, scheduling so that other channels are not assigned to the wireless resource blocks which are adjacent to a first channel when the first channel whose frequency characteristic is not orthogonal to the other channels is assigned to a certain wireless resource block resulting from the division, and creating scheduling information on the scheduling that is performed, by the wireless base station; transmitting the scheduling information to the mobile station by the wireless base station; and transmitting a channel signal to the wireless base station on the basis of the scheduling information by the mobile station and receiving the channel signal transmitted from the mobile station by the wireless base station.

The present invention makes it possible to provide a wireless communication system and wireless communication method which improve the transmission efficiency even when asynchronous channels are transmitted.

BRIEF DESCRIPTION OF THE DRAWINGS

FIG. 4 shows an example of assignment to wireless resource blocks;
FIG. 5A shows an example of assignment to wireless resource blocks and FIG. 5B shows an example of a table.

DESCRIPTION OF THE PREFERRED EMBODIMENTS

Preferred embodiments of the present invention will be described hereinbelow with reference to the drawings.

Figure 1:
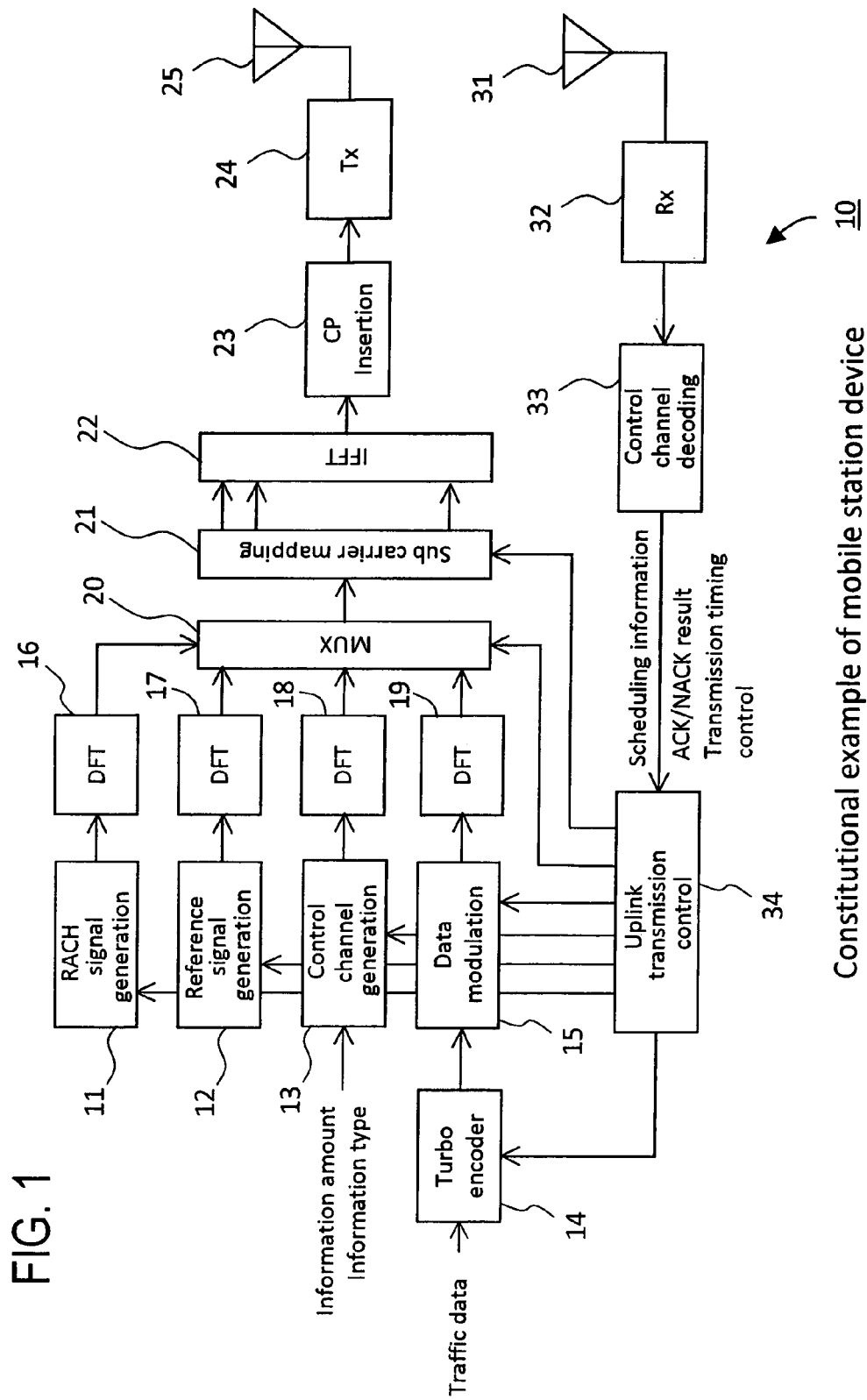
FIG. 1 shows a constitutional example of a mobile station.
Figure 2:
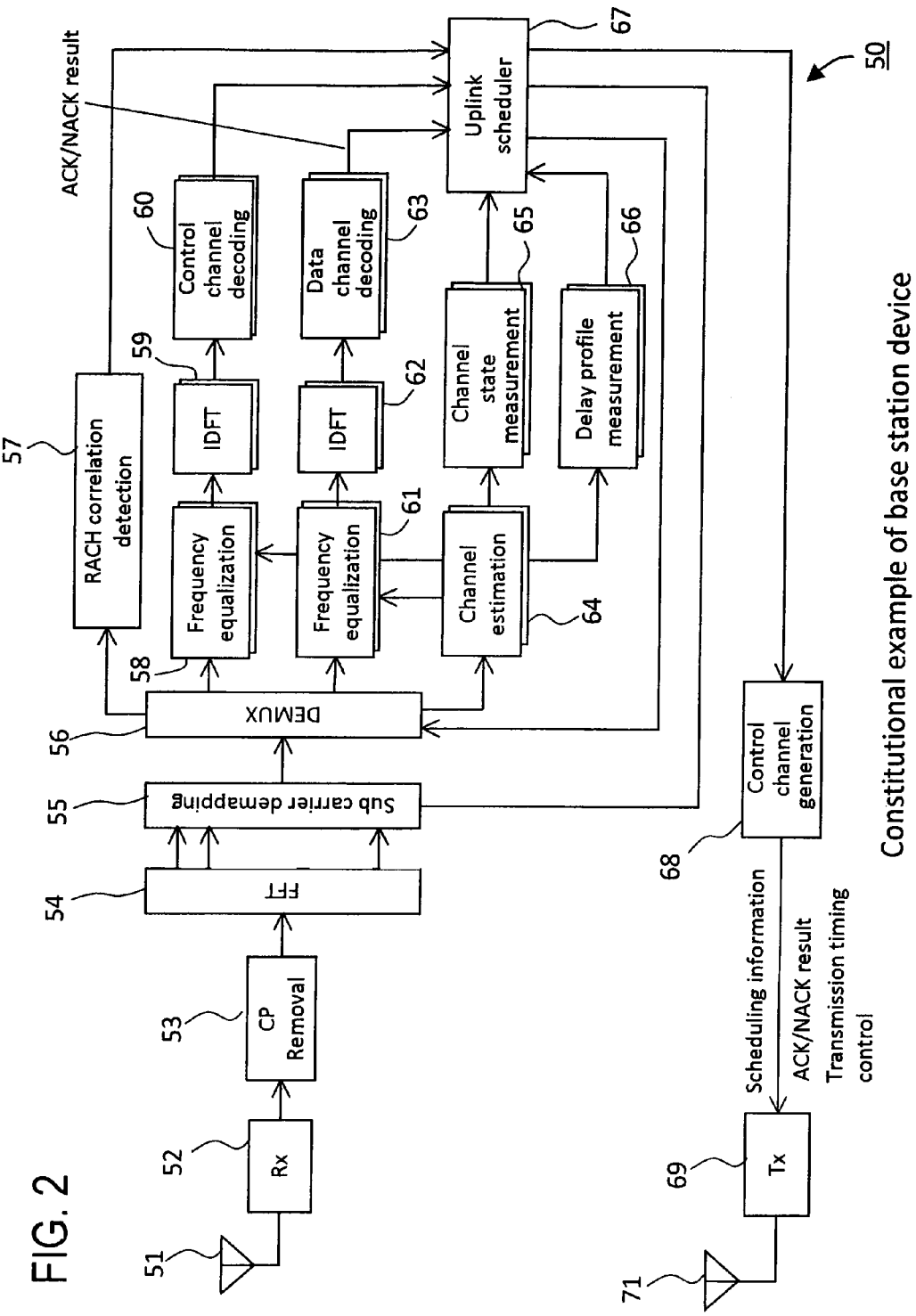
FIG. 2 shows a constitutional example of a base station.

The wireless communication system has a mobile station 10 and a base station 50. FIG. 1 shows a constitutional example of the mobile station 10 and FIG. 2 shows a constitutional example of the base station 50.

The mobile station 10 has a RACH signal generation unit 11, a reference signal generation unit 12, a control channel generation unit 13, a turbo encoder 14, a data modulation unit 15, a first to fourth DFT (Discrete Fourier Transforms) 16 to 19, a multiplexer (MUX) 20, a sub carrier mapping unit 21, an IFFT (Inverse Fast Fourier Transform) 22, a CP insertion unit 23, a wireless transmission unit (Tx) 24, a transmission antenna 25, a reception antenna 31, a wireless reception unit (Rx) 32, a control channel decoding unit 33, and an uplink transmission control unit 34.

The RACH signal generation unit 11 generates random access channel (RACH) signal and outputs to the first DFT 16. The reference signal generation unit 12 generates uplink reference channel signal and outputs to the second DFT 17. The control channel generation unit 13 input information which represents information amount of traffic data and the type of traffic data information and generates control channel signal. The control channel signal thus generated is output to the third DFT 18.

The turbo encoder 14 encodes with respect to the input traffic data and the data modulation unit 15 modulates the encoded traffic data. The turbo encoder 14 and data modulation unit 15 generate uplink shared data channel signal. The generated uplink shared data channel signal is output to the fourth DFT 19.

The first to fourth DFT 16 to 19 performs a discrete Fourier Transform on each input signal and converts time domain signals into frequency domain signals. The multiplexer 20 multiplexes each of the converted signals and outputs to the sub-carrier mapping unit 21.

The sub-carrier mapping unit 21 maps the multiplexed signal to optional subcarriers so as to transmit with wireless resources of an optional frequency. The mapped signal is output to the IFFT unit 22.

The IFFT unit 22 re-converts the mapped frequency domain signals into time domain signals once again and outputs to CP insertion unit 23. The desired DFT-Spread-OFDM for transmitting the generated signal using the wireless resource of the optional frequency is constituted by DFT 16 to 19, sub carrier mapping unit 21, and IFFT unit 22.

The CP insertion unit 23 adds a CP (Cyclic Prefix) to the signal after the IFFT. The wireless transmission unit (Tx) 24 converts the signal after the CP insertion into RF signals, and the transmission antenna 25 transmits the RF signal.

The wireless reception unit 32 (Rx) converts the signals received from the reception antenna 31 from RF signals into digital signals and outputs the signals to the control channel decoding unit 33.

The control channel decoding unit 33 extracts scheduling information from the base station 50, the ACK/NACK result for the uplink shared data channel, and the transmission timing control information, and so forth. The downlink reference channel is used for the decoding of the control channel.

The uplink transmission control unit 34 controls the respective signal generation units 11 to 13, multiplexer 20, and sub-carrier mapping unit 21, on the basis of the extracted scheduling information, ACK/NACK result with respect to the uplink shared data channel, and the transmission timing information, and so forth.

FIG. 2 shows a constitutional example of base station 50. Base station 50 has a reception antenna 51, a wireless reception unit (Rx) 52, a CP removal unit 53, an FFT unit 54, a sub-carrier demapping unit 55, a demultiplexer 56, a RACH correlation detection unit 57, a first and second frequency equalization units 58 and 61, a first and second IDFT units 59 and 62, a control channel decoding unit 60, a shared data channel decoding unit 63, a channel estimation unit 64, a channel state measurement unit 65, a delay profile measurement unit 66, an uplink scheduler unit 67, a control channel generation unit 68, and a wireless transmission unit (Tx) 69.

The wireless reception unit 52 converts the uplink RF signal received by the reception antenna 51 into a baseband signal and outputs to the CP removal unit 53.

The CP removal unit 53 removes the CP from the baseband signal with predetermined timing and outputs the removed signal to the FFT unit 54.

The FFT unit 54 converts the whole of the system bandwidth from a time domain signal to a frequency domain signal by means of a fast Fourier Transform and outputs the converted signal to the sub-carrier demapping unit 55.

The sub-carrier demapping unit 55 returns the mapped sub carrier into the multiplexed signal and the demultiplexer 56 distributes each of the multiplexed signals to predetermined channels.

The RACH correlation detection unit 57 determines the existence of RACH transmission and detects a preamble when the preamble is transmitted, on the basis of the RACH signal from the demultiplexer 56, and generates transmission timing control information from a delay profile that is sought at the same time as correlation detection. Information relating to the RACH transmission result (the existence of RACH transmission) is output to the uplink scheduler unit 67.

The first and second frequency equalization units 58 and 61 perform reception processing of channel compensation by using channel estimation values from the channel estimation unit 64 (returns the phase rotation or the like generated by the transmission to the original transmission state). The processed control channel signal is decoded by the first IDFT 59 and control channel decoding unit 60. Further, the processed shared data channel signal is decoded by the second IDFT 62 and the shared data channel decoding unit 63.

The channel estimation unit 64 determines the channel estimation value from the uplink reference signal output by the demultiplexer 56. The channel estimation value is output to the first and second frequency equalization units 58 and 61, the channel state measurement unit 65, and the delay profile measurement unit 66.

The channel state measurement unit 65 measures the communication quality (channel state) from the channel estimation value and outputs the measured value to the uplink scheduler unit 67 as channel information. The channel information is the reception power value S of the reference signal for each user (or for each wireless resource block) or the signal to interference power ratio SIR, for example.

The delay profile measurement unit 66 measures the delay profile from the channel estimation value. The measured delay profile is used for the uplink transmission timing control. The measured delay profile is output to the uplink scheduler unit 67.

The uplink scheduler unit 67 performs scheduling processing on the basis of the result of RACH detection by the RACH correlation detection unit 57, the control channel from the control channel decoding unit 60, the ACK/NACK result from the shared data channel decoding unit 63 (the ACK/NACK result for the shared data channel), channel information (communication quality) from the channel state measurement unit 65, and the transmission timing control information of the uplink from the delay profile measurement unit 66 and generates schedule information (information on the assignment of wireless resources to the respective mobile stations 10). In this embodiment, a schedule procedure (described subsequently) is mainly executed by utilizing channel information from the channel state measurement unit 65.

The uplink scheduler unit 67 outputs the generated schedule information, ACK/NACK result, and transmission timing control information to the control channel generation unit 68. The control channel generation unit 68 generates a control channel from the schedule information and so forth. The generated control channel is converted into RF signal by the wireless transmission unit (Tx) 69 and transmitted from a transmission antenna 71.

Figure 3:
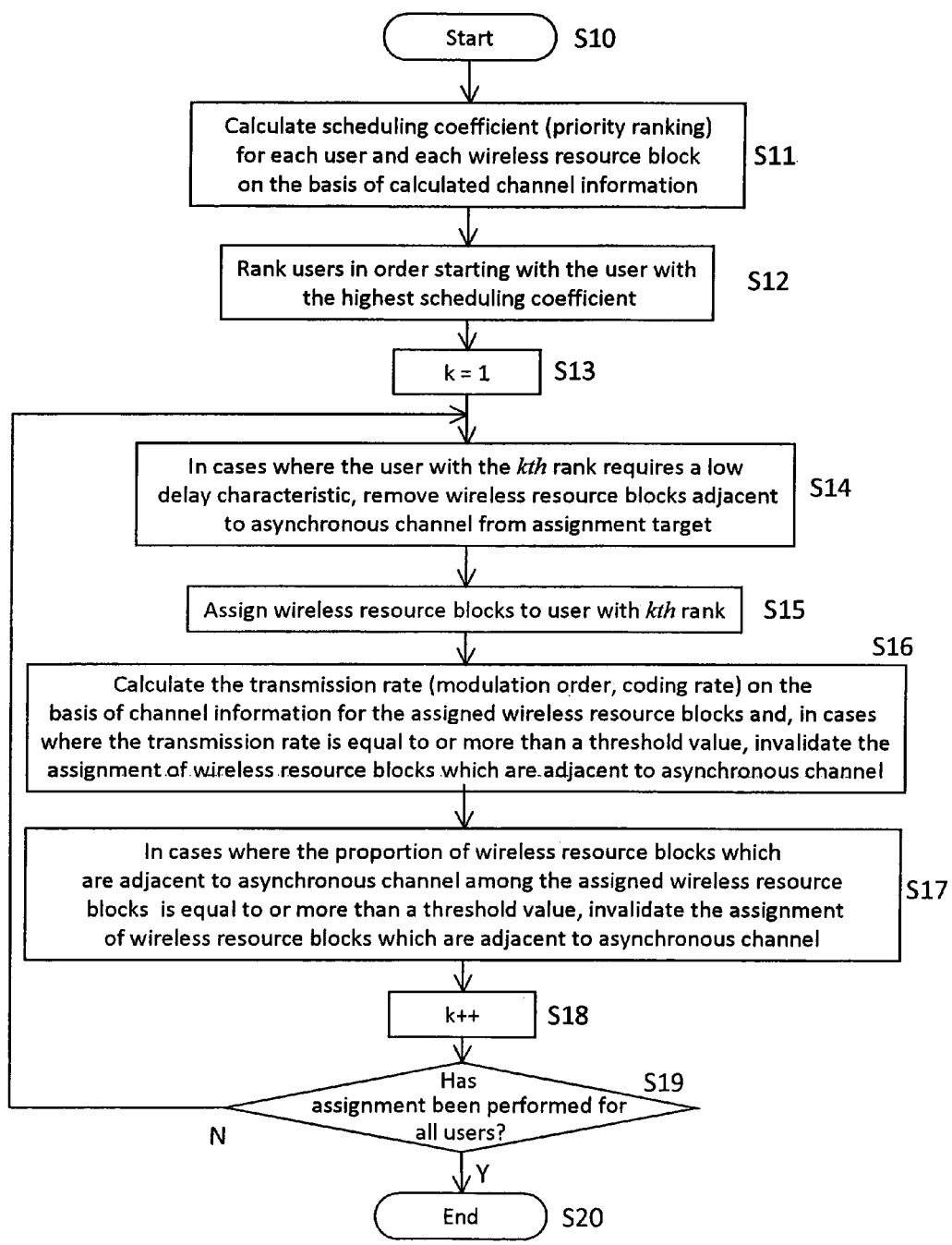
FIG. 3 shows an example of a scheduling procedure.

FIG. 3 shows an example of a scheduling processing. This scheduling procedure assumes an LTE uplink and is executed by the uplink scheduler unit 67 of the base station 50. The assignment of channels to wireless resource blocks is carried out as a result of the execution of this scheduling processing.

First, the uplink scheduler unit ('scheduler unit' hereinbelow) 67 starts to execute this processing (S10), calculates a schedule coefficient (priority ranking) for each user and each wireless resource block on the basis of channel information which is reported by the channel state measurement unit 65 (S11), and performs ranking in order starting with the user having the highest schedule coefficient (S12).

For example, the scheduler unit 67 performs ranking from the value S of the reception power for each user in order from the user having the highest reception power value S. In place of the reception power value S, the signal to interference power ratio SIR or the like may also be used. Further, the scheduler unit 67 assigns wireless resource blocks by means of the following processing in order starting from the user with the highest ranking.

The scheduler unit 67 sets 'k' which represents the number of users as '1' (S13), discriminates whether the user with the 'k'th rank transmits data requiring a low delay characteristic, in cases where the low delay characteristic is required, removes the wireless resource blocks which are adjacent to the asynchronous channel from the assignment target (S14), and assigns the signal of the 'k'th user to the other wireless resource blocks as the scheduling target (S15).

Since the control channel generation unit 13 of the mobile station 10 (See FIG. 1) generates the control channel from the transmitted data type information, data type information is contained in the information decoded by the control channel decoding unit 60 of the base station 50.

The scheduler unit 67 is able to discriminate whether the data is data requiring the low delay characteristic (high priority) from the data type information. High priority data is, for example, packet data of real time transmission data services (VoIP, games, or the like), packet data to which persistent scheduling that performs periodical assignment of wireless resources and channel data such as control-channel.

Further, in cases where the 'k'th user performs communication by using such data, the scheduler unit 67 removes the wireless resource blocks which are adjacent to the asynchronous channel such as the RACH channel from the assignment target and assigns the other wireless resource blocks as the scheduling target.

FIG. 4 shows an assignment example. In FIG. 4, the horizontal axis represents the frequency axis and the respective blocks are wireless resource blocks. When the RACH is assigned to wireless resource blocks indicated by the oblique lines, the data requiring a low delay characteristic are assigned to other blocks so that the blocks adjacent to the wireless resource blocks to which the RACH has been assigned (the four blocks $S_{11}, S_{21}, S_{12}, S_{13}$) are not assigned. In the example of FIG. 4, the two blocks to the left and right are the adjacent blocks but there may also be one block each of the left and right adjacent blocks or three or four blocks of each of the left and right adjacent blocks.

Thus, when the data requiring a low delay characteristic is assigned to wireless resource blocks adjacent to an asynchronous channel such as a RACH channel, sometimes a signal cannot be recovered correctly due to interference and it is necessary to perform the retransmission control.

Therefore, the signal of the 'k'th user is not assigned to these wireless resource blocks in order to avoid this problem.

Returning now to FIG. 3, the scheduler unit 67 then calculates the transmission rate (modulation order, coding rate) on the basis of the channel information of the assigned wireless resource blocks and, when the transmission rate is equal to or more than a threshold value, invalidates the assignment of the wireless resource blocks adjacent to the asynchronous channel (S16).

For example, the following processing is carried out. That is, the scheduler unit 67 determines the average value $S_{AV}$ of the power values S of the respective users from the channel information of the wireless resource blocks assigned thus far as shown in FIG. 5A. The scheduler unit 67 then determines the transmission rate from a table 671 which shows the relationship between the average value $S_{AV}$ and the transmission rate, as shown in FIG. 5B. For example, the scheduler unit 67 acquires the transmission rate '3' from table 671 when the average power value $S_{AV}$ is '10 dB'. The transmission rates are predetermined values in table 671 and the modulation order and the coding rate (the ratio between the number of bits before and after error correction coding is determined from the values in table 671.

In the example in FIG. 5B, when the transmission rate is '3', the modulation order is '6' (multi-valued number representing 64QAM) and the coding rate is '0.5'. Naturally, the values and so forth represent an example and this embodiment can also be implemented using other values.

When the transmission rate thus calculated (acquired from table 671) has a high value, a modulation scheme with a high error rate in comparison with other scheme such as '64QAM' is easily selected and a scheme with a high coding rate is readily selected. This transmission rate readily produces errors due to the effects of interference.

Therefore, by ensuring that a channel with a high transmission rate is not assigned to the wireless resource blocks adjacent to the RACH, retransmission is not performed and the uplink transmission efficiency is improved.

Table 671 shown in FIG. 5B may be saved in the scheduler unit 67 or in other blocks in the base station 50.

Returning now to FIG. 3, the scheduler unit 67 then invalidates the assignment of the wireless resource blocks adjacent to an asynchronous channel in cases where the proportion of wireless resource blocks adjacent to the asynchronous channel among the assigned wireless resource blocks is equal to or more than a threshold value (S17).

Figure 6:
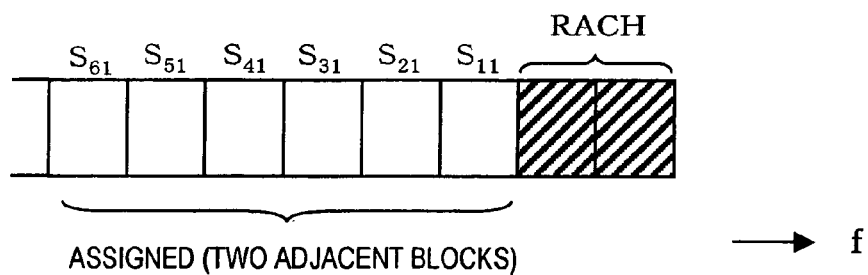
FIG. 6 shows an example of assignment to wireless resource blocks.

FIG. 6 shows an example of assignment to wireless resource blocks in this case. When the 'k'th user is assigned to the six wireless resource blocks to the left of the RACH, the ratio of the blocks adjacent to the RACH and the number of assigned wireless resource blocks is '2/6' and the scheduler 67 compares this value with the threshold value. When the value is equal to or more than the threshold value, the ratio of adjacent blocks is high and the error rate is also high.

That is, the scheduler unit 67 performs scheduling so that channels of narrow bandwidth are not assigned to wireless resource blocks adjacent to the asynchronous channel. For example, when a shared data channel is assigned to block S11 adjacent to the asynchronous channel, the error rate increases when interference from the asynchronous channel is received. However, channel assignment with respect to a wide bandwidth is performed and, in cases where this part of the bandwidth constitutes wireless resource blocks adjacent to the asynchronous channel, even when the interference of the asynchronous channel is received, the effect of this interference is insignificant and the probability of a transmission error occurring is low as a result of error correction.

Returning now to FIG. 3, the scheduler 67 adds '1' to 'k' (S19) and judges whether assignment has been performed for all the users multiplexed over the transmission interval (S19). When assignment has been performed (Y in S19), the processing is terminated (S20) and, when such assignment has not been performed (N in S19), the processing returns to S14, whereupon the above processing is repeated.

Thus, the uplink scheduler 67 of the base station 50 carries out scheduling processing so that channels whose frequency characteristics are not orthogonal to other channels are assigned to certain wireless resource blocks and channels are not assigned to the wireless resource blocks adjacent to these channels. Because other channels such as shared data channels are not assigned to wireless resource blocks adjacent to channels whose frequency characteristics are not orthogonal, the occurrence of interference decreases and the transmission efficiency can be improved.

As mentioned earlier, the scheduling information that has been scheduled in this way is transmitted from the base station 50 to the mobile station 10 via the control channel generation unit 68. Thereafter, the transmission of a channel from the mobile station 10 to the base station 50, that is, in an uplink direction, is carried out on the basis of this scheduling information.

Another example will be described next.

In S16 of the above scheduling procedure, the scheduler 67 performed scheduling so that channels with a high transmission rate per band were not assigned. Conversely, processing to perform scheduling so that channels with a low transmission rate per band are not assigned may also be considered. In the uplink, the base station 50 considers the effect of the interference exerted by mobile stations 10 at the edge of the cell on the other cells and sometimes transmission power control is exercised on the respective mobile stations 10. Here, transmission errors readily occur because the transmission power is kept low for mobile stations 10 with a low transmission rate that are located at the edge of the cell. In such a case, the uplink transmission efficiency can be improved by ensuring that channels with a low transmission rate are not assigned to wireless resource blocks which are adjacent to an asynchronous channel.

Figure 7:
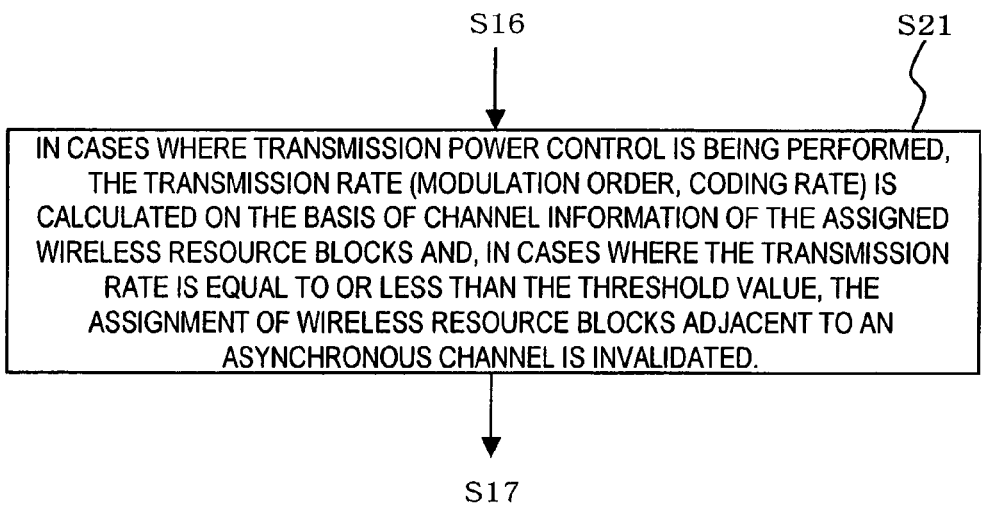
FIG. 7 shows another example of a scheduling procedure.
Figure 8:
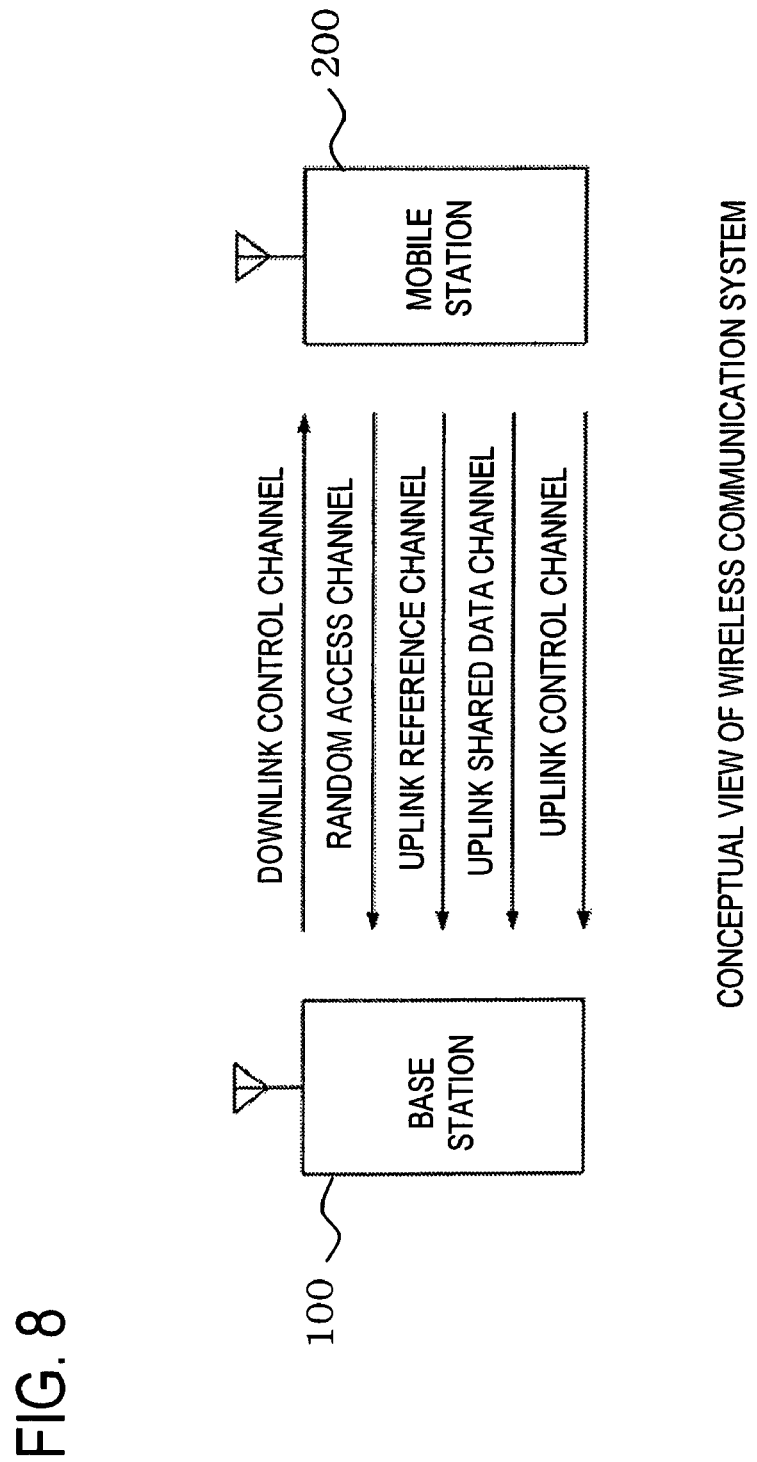
FIG. 8 shows a conceptual diagram of a wireless communication system.
Figure 9:
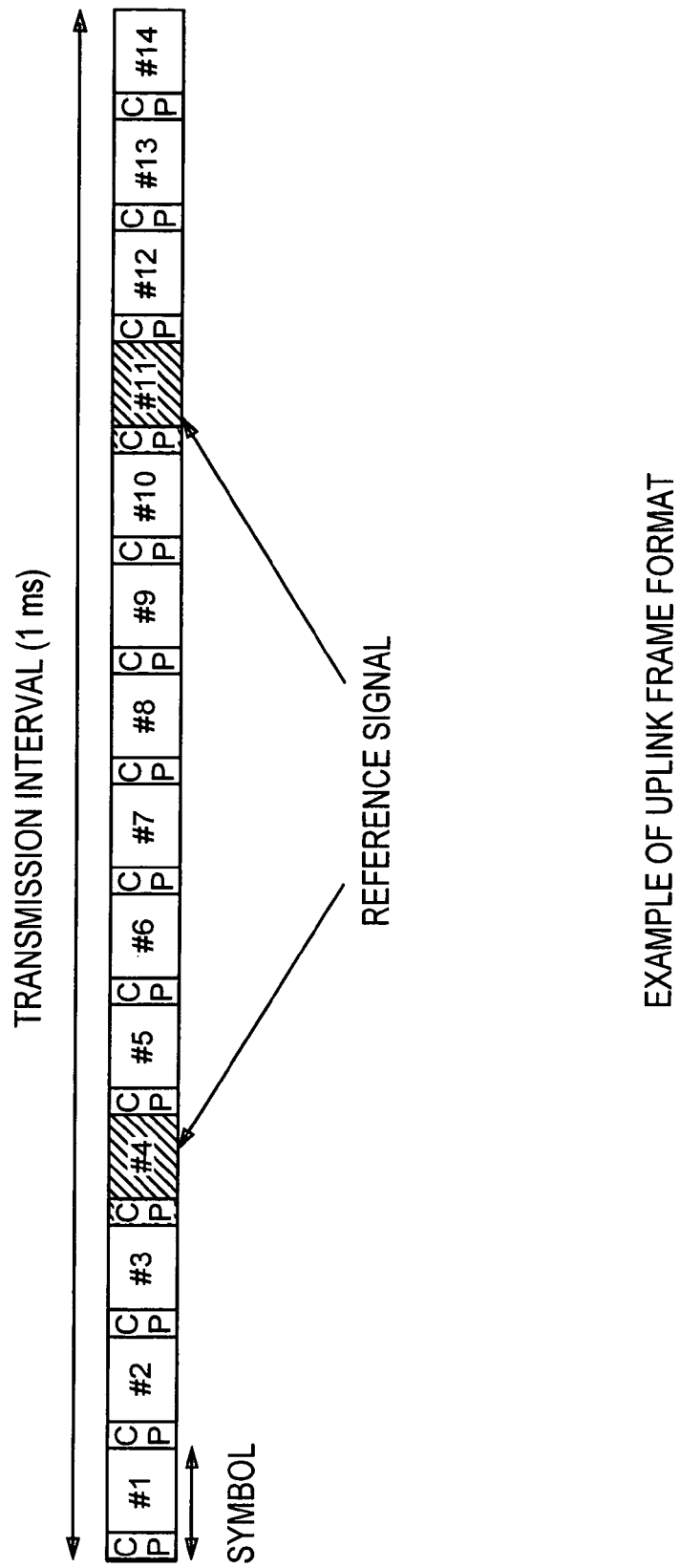
FIG. 9 shows an example of an uplink frame format.
Figure 10:
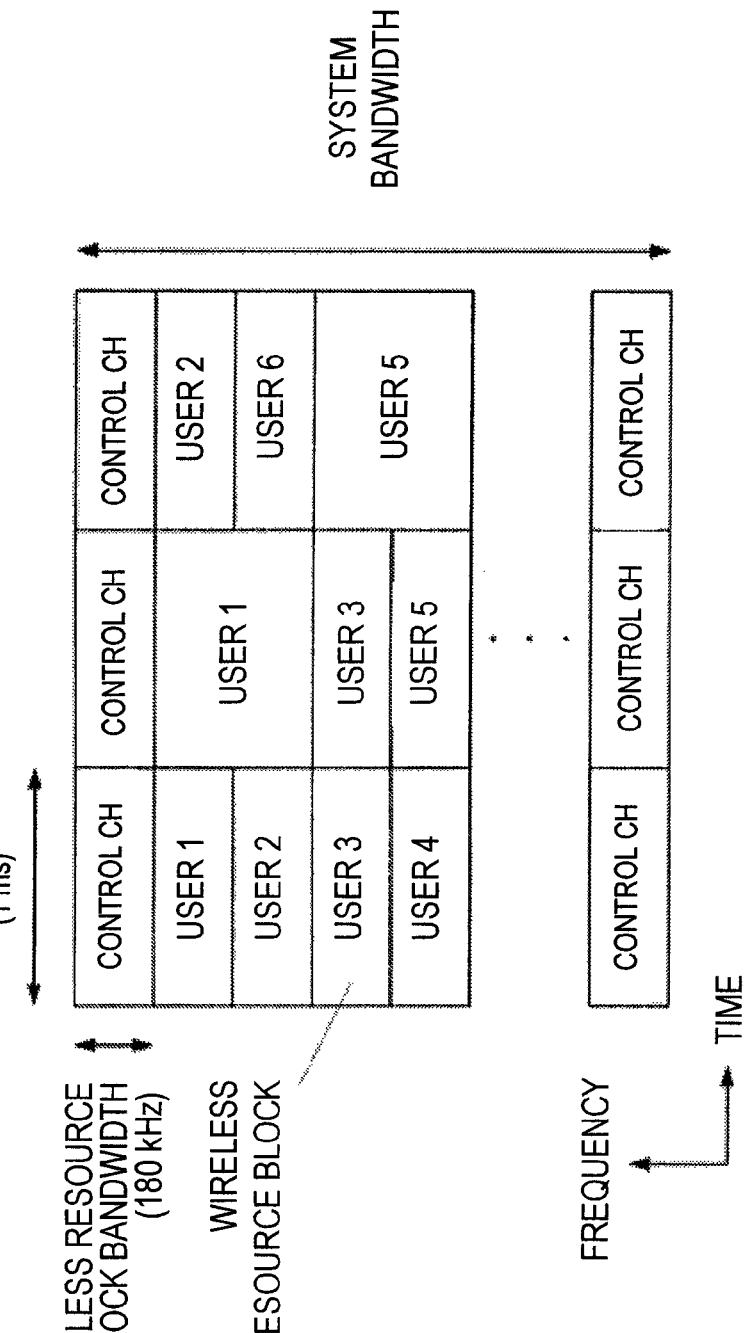
FIG. 10 shows an example of an uplink multiplexing method.
Figure 11:
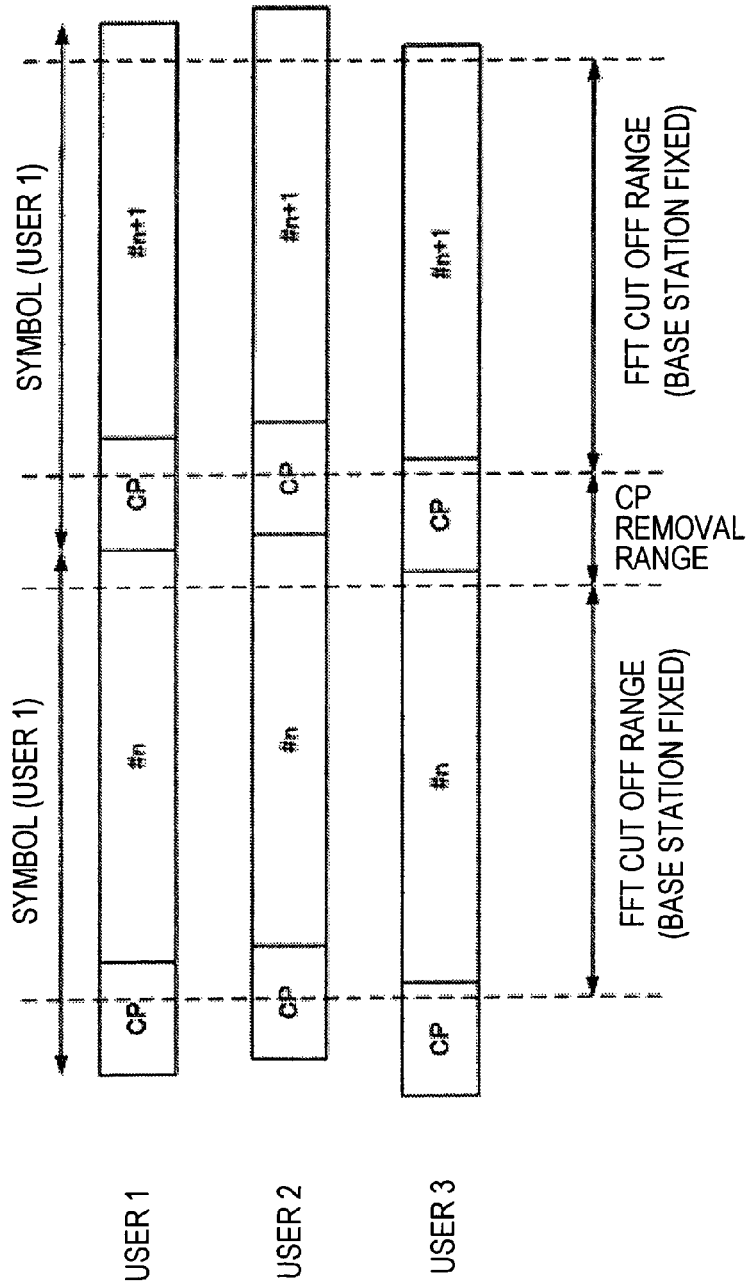
FIG. 11 shows an example of the reception timing of the base station in a synchronized state.
Figure 12:
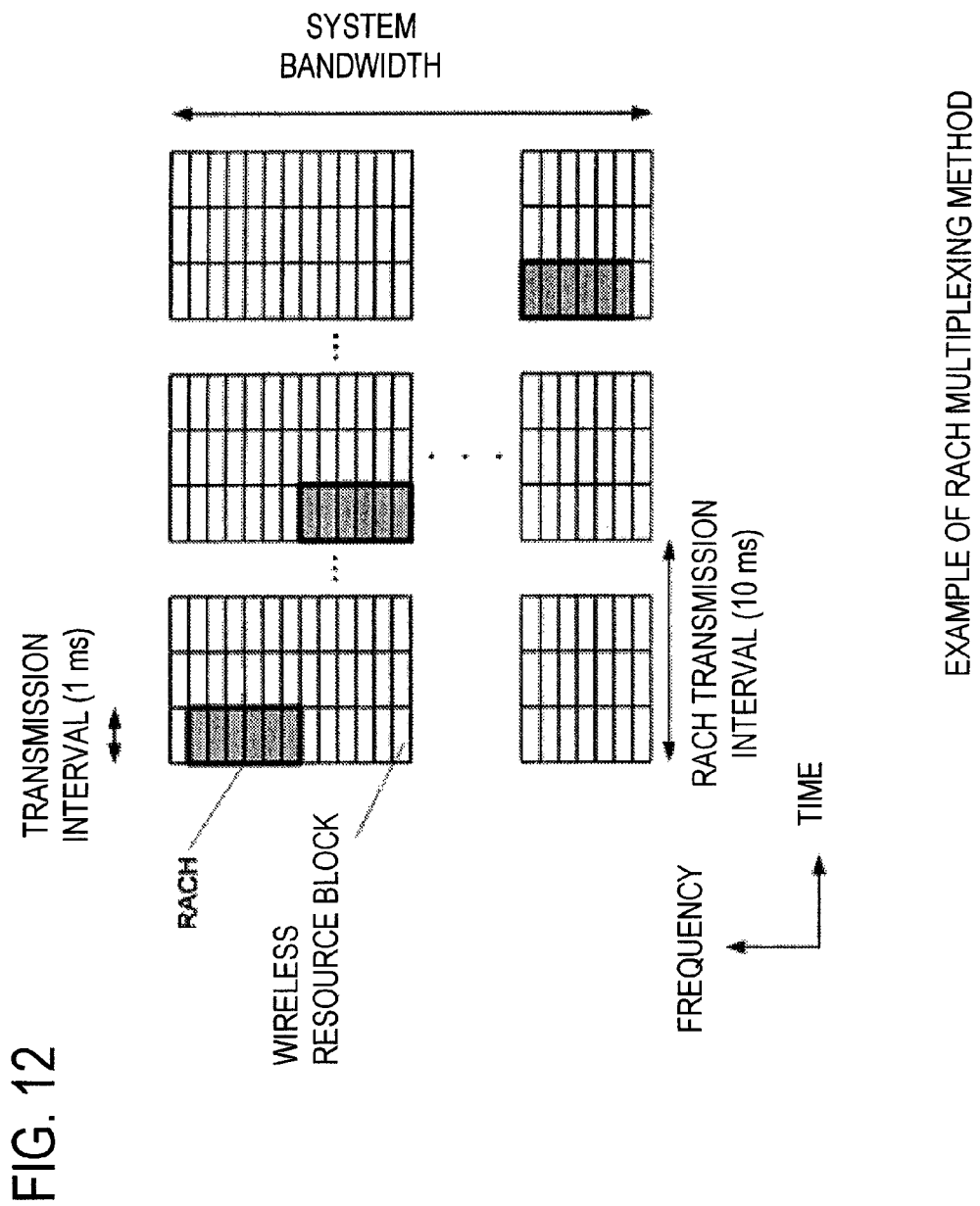
FIG. 12 shows an example of a random-access channel multiplexing method.
Figure 13:
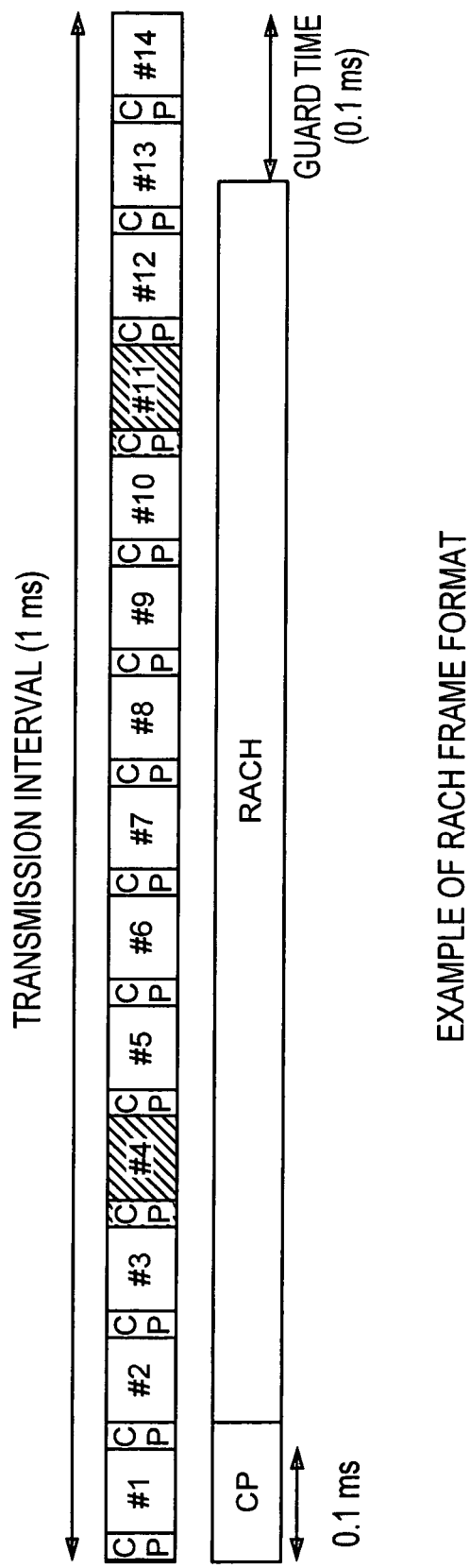
FIG. 13 shows an example of a random-access channel frame format.
Figure 14:
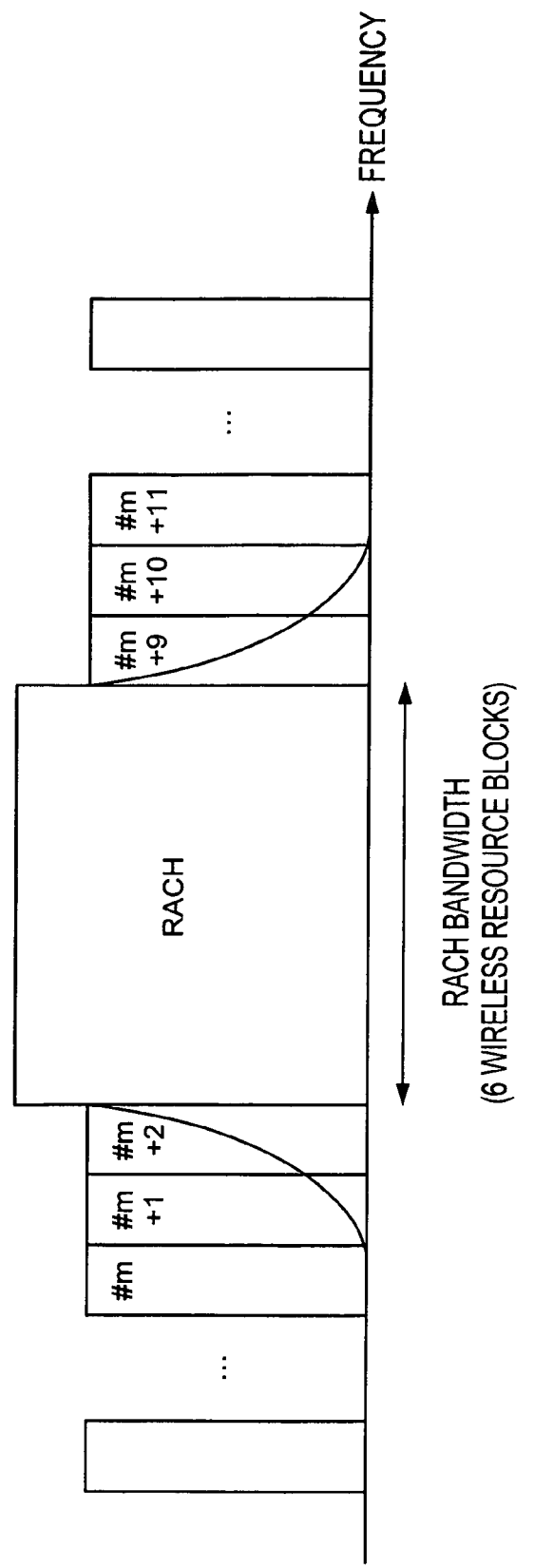
FIG. 14 serves to illustrate interference of the random access channel with other channels.

More specifically, as shown in FIG. 7, in cases where transmission power control is performed, the scheduler 67 calculates the transmission rate (the modulation order and coding rate) on the basis of the assigned wireless resource block channel information and, when the transmission rate is equal to or less than a threshold value, ensures that there is no assignment to wireless resource blocks which are adjacent to an asynchronous channel (S21). The fact that the transmission rate is acquired from table 671 is the same as in the example shown in FIG. 3.

Moreover, in the above example, the assignment of wireless resource blocks which are adjacent to an asynchronous channel is invalidated for users having a high transmission rate per band (modulation order and coding rate). Naturally, the existence, in addition to the transmission rate, of, for example, path loss, UE Power Headroom (the difference between the maximum transmission power of a mobile station 10 and the current transmission power), the transmission power of the mobile station 10, a target SIR for the uplink transmission power control (TPC), a target reception power S for the uplink TPC, channel information reported by the mobile station 10 (CQI: Channel Quality Indicator), a modulation order (in cases where control is performed using only a modulation order), an uplink antenna multiplexed transmission (Multiple Input Multiple Output (MIMO)) may constitute an indication of whether assignment is to be invalidated. This information is included in the control channel from the control channel decoding unit 60 and channel information from the channel state measurement unit 65. Further, these parameters afford the same operating effects which can be implemented in the same way as the above example not only in cases where the transmission rate is high but even in the opposite case where the transmission rate is low.

In addition, although the schedule priority ranking (schedule coefficient) is determined on the basis of the communication quality (channel state) in the above example, the schedule coefficient may also be determined irrespective of the channel state as per a Round Robin schedule, for example.

Furthermore, in the above example, in cases where there is data which have a low delay characteristic (high priority data) (S14), where the transmission rate is equal to or more than the threshold value (S16), where the proportion of blocks adjacent to an asynchronous channel among the assigned wireless resource blocks is equal to or more than a threshold value (S17), the assignment of wireless resource blocks is invalidated. Thus, rather than these three conditions, a scheduling procedure may be executed in any one process and, when the process ends, the scheduling procedure may be terminated. Alternatively, rather than these three conditions, the scheduling procedure may always be executed with the thought of removing those wireless resource blocks which are adjacent to the asynchronous channel from the assignment targets. In any case, scheduling may be performed so that channels whose frequency characteristics are not orthogonal to other channels are assigned to certain wireless resource blocks and so that channels are not assigned to the wireless resource blocks which are adjacent to those channels.

Moreover, all of the above examples used a RACH as an example of an asynchronous channel. Naturally, where asynchronous channels other than a RACH channel are concerned, the same operating effects which can be implemented in the same way are also afforded using channels which are transmitted via a broadcast channel, for example.

What is claimed is:

1. A wireless communication system comprising:
 a mobile station; and
 a wireless base station, wherein
   the wireless base station further comprising a scheduler which divides system bandwidth into a plurality of wireless resource blocks, each of which has a same predetermined bandwidth, in a frequency domain, performs scheduling so that, when a first channel whose frequency characteristic is not orthogonal to other channels is assigned to a certain wireless resource blocks resulting from the division the other channels are not assigned to the wireless resource blocks which are adjacent the certain wireless resource blocks, and creates scheduling information on the scheduling that is performed; and a transmission unit which transmits the scheduling information created by the scheduler to the mobile station,
   the mobile station transmits a channel signal to the wireless base station on the basis of the scheduling information and the wireless base station receives the channel signal transmitted from the mobile station, and;
   the scheduler performs scheduling so that the channels which have a transmission rate equal to or more than a threshold value are not assigned to the wireless resource blocks which are adjacent to the first channel.

2. The wireless communication system according to claim 1, wherein the first channel is a random access channel.

3. The wireless communication system according to claim 1, wherein the transmission rate is a value that is calculated from a modulation order and a coding rate on the basis of the channel transmitted from the mobile station.

4. The wireless communication system according to claim 1, wherein the scheduler performs scheduling so that the channels which have a transmission rate equal to or less than a threshold value are not assigned to the wireless resource blocks which are adjacent to the first channel, when the base station is performing transmission power control with respect to the mobile station.

5. The wireless communication system according to claim 1, wherein the scheduler performs scheduling so that the channels which require a low delay characteristic are not assigned to the wireless resource blocks which are adjacent to the first channel.

6. The wireless communication system according to claim 5, wherein the channels which require the low delay characteristic are packet data for real-time services including sound or games.

7. The wireless communication system according to claim 1, wherein the scheduler performs scheduling so that channels of a narrow bandwidth are not assigned to the wireless resource blocks which are adjacent to the first channel.

8. The wireless communication system according to claim 7, wherein the scheduler performs scheduling so that the channels of the narrow bandwidth are not assigned by ensuring that the wireless resource blocks which are adjacent to the first channel are not assigned when the proportion of the wireless resource blocks which are adjacent to the first channel among the assigned wireless resource blocks is equal to or more than a threshold value.

9. A wireless communication method in a wireless communication system having a mobile station and a wireless base station, comprising:

dividing system bandwidth into a plurality of wireless resource blocks, each of which has a same predetermined bandwidth, in a frequency domain, performs scheduling so that, when a first channel whose frequency characteristic is not orthogonal to other channels is assigned to a certain wireless resource blocks resulting from the division the other channels are not assigned to the wireless resource blocks which are adjacent to the certain wireless resource blocks, and creating scheduling information on the scheduling that is performed, by the wireless base station;

transmitting the scheduling information to the mobile station, by the wireless base station; and transmitting a channel signal to the wireless base station on the basis of the scheduling information by the mobile station and receiving the channel signal transmitted from the mobile station by the wireless base station, wherein the scheduler performs scheduling so that the channels which have a transmission rate equal to or more than a threshold value are not assigned to the wireless resource blocks which are adjacent to the first channel.

* * * * *

UNITED STATES PATENT AND TRADEMARK OFFICE
CERTIFICATE OF CORRECTION

PATENT NO. : 8,175,044 B2  
APPLICATION NO. : 12/010848  
DATED : May 8, 2012  
INVENTOR(S) : Hiroyuki Seki et al.

Page 1 of 1

It is certified that error appears in the above-identified patent and that said Letters Patent is hereby corrected as shown below:

On the title page of the issued patent item number [73] delete "NTT DoCoMo" and insert -- NTT DOCOMO, INC. --

Signed and Sealed this  
Twenty-third Day of July, 2013

Teresa Stanek Rea  
*Acting Director of the United States Patent and Trademark Office*